L. W. BROWN.
SPRING WHEEL.
APPLICATION FILED MAY 11, 1912.
1,083,316.
Patented Jan. 6, 1914.
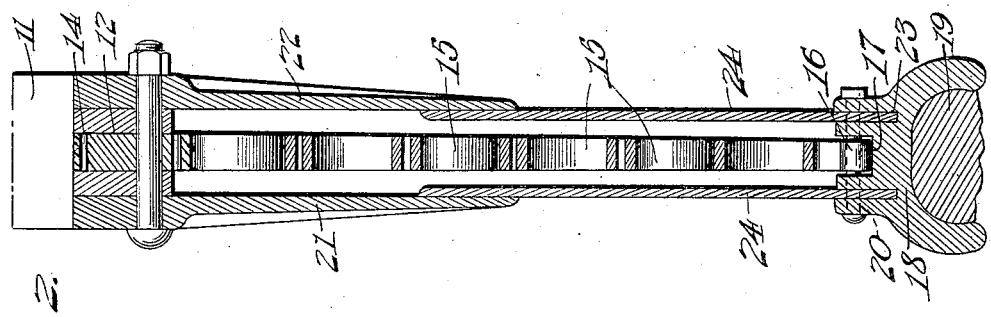
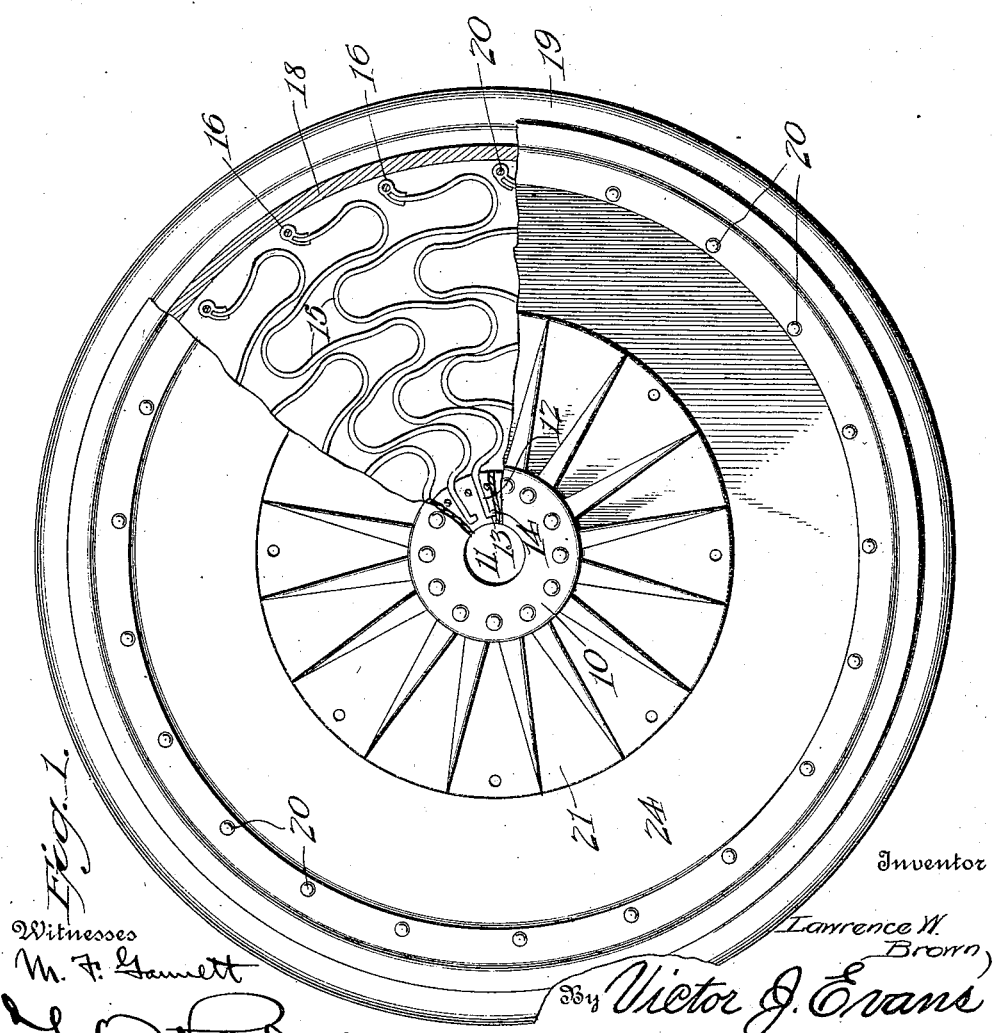

UNITED STATES PATENT OFFICE.

LAWRENCE W. BROWN, OF CLINTON, MISSOURI.

SPRING-WHEEL.

1,083,316.  Specification of Letters Patent.  Patented Jan. 6, 1914.

Application filed May 11, 1912. Serial No. 696,739.

*To all whom it may concern:*

Be it known that I, LAWRENCE W. BROWN, a citizen of the United States, residing at Clinton, in the county of Henry and State of Missouri, have invented new and useful Improvements in Spring-Wheels, of which the following is a specification.

The invention relates to vehicle wheels and more particularly to the class of spring wheels.

The primary object of the invention is the provision of a vehicle wheel of this character in which the same will possess the requisite resiliency so as to absorb all shocks and jars incident to the travel thereof without requiring the use of pneumatic or cushion tires ordinarily employed for this purpose, although the same may be mounted upon the wheel should it be desired.

Another object of the invention is the provision of a spring wheel in which the felly thereof is resiliently connected to the hub so that the said felly may be displaced when traveling upon irregular surfaces so as to absorb or take up shocks or jars incident to the travel of the wheel and thereby relieving the vehicle body therefrom, thus increasing the life of the wheel as well as the vehicle body.

A further object of the invention is the provision of a wheel of this character which is simple in construction, possessing the requisite resiliency, yet maintaining its strength and durability, and also which is thoroughly reliable and efficient in its purpose, and inexpensive in manufacture.

With these and other objects in view the invention consists in the construction, combination and arrangement of parts as will be hereinafter fully described, illustrated in the accompanying drawings, and pointed out in the claim hereunto appended.

In the drawings:—Figure 1 is a side elevation of a spring wheel constructed in accordance with the invention, the same being shown partly in section. Fig. 2 is a fragmentary vertical transverse sectional view thereof.

Similar reference characters indicate corresponding parts throughout the several views in the drawings.

Referring to the drawings by numerals, the spring wheel comprises a hub 10 which is formed from a plurality of separable sections having the usual central spindle receiving bore 11, the innermost or medial section of the hub being formed with slots 12 opening through the sides and outer periphery thereof, and these slots are provided with right angular branches at their inner ends in which are detachably engaged correspondingly shaped inner terminal ends 14 of sinuous-shaped spring metallic spokes 15, the outer ends of which have secured thereto eye terminals 16 projecting into a channel 17 formed centrally in the inner periphery of the felly 18 either of the ordinary or clencher type, on which is mounted a tire 19 which is held fast thereon in any suitable manner. The inner ends of the spokes are inserted in the slots 12 prior to the positioning of the medial section of the hub between the remaining sections thereof when assembling the wheel. Passed transversely through the felly 18 at intervals throughout its circumference are bolt members 20 the same being loosely passed through the eye terminal pieces 16 thereby connecting the spokes 15 to the felly.

Fixed to opposite ends of the hub 10 are removable inner and outer closing disks 21 and 22 respectively, while suitably fixed in the channels 23 formed in the inner periphery of the felly 18 and concentrically disposed with respect to the disks 21 and 22 are outer ring-like plates 24, the same being extended within the space between the inner and outer disks 21 and 22 and frictionally contact with the inner faces thereof, thus concealing the spokes 15 from view. The outer ring-like plates 24 on the felly 18 are designed to prevent lateral displacement of the felly, yet will permit the contraction or expansion of the spring spokes 15 for the displacement of the said felly at right angles to the axis of movement of the wheel, thereby enabling the absorbing of all shocks and jars incident to the travel of the wheel over irregular surfaces.

What is claimed is:—

A spring wheel comprising a hub having slots opening through the outer periphery thereof and provided with substantially right-angular branches at their inner ends, spring spokes having inner terminals correspondingly shaped to the said slots and detachably engaged therein, a felly arranged concentrically about the hub and having a plurality of channels in its inner periphery, eye terminals at the outer ends of the spokes and located within one of said channels, disks arranged at opposite ends of the hub, fasteners securing the disks to the hub, bolt members passed transversely through the felly and engaged in the eye terminals for connecting the latter with the felly, plates engaged in the remaining channels in the felly and adapted to slidably connect with the said disks for preventing lateral displacement of the felly with respect to the hub, the said fasteners for the disks and the bolt members engaging the eye terminals being passed through the said disks, and plates for connecting the same to the hub and felly respectively.

In testimony whereof I affix my signature in presence of two witnesses.

LAWRENCE W. BROWN.

Witnesses:
J. F. SHOEMAKER,
ED. C. PEELOR.

---

Copies of this patent may be obtained for five cents each, by addressing the "Commissioner of Patents, Washington, D. C."